United States Patent
Lamprich et al.

(10) Patent No.: US 7,552,977 B2
(45) Date of Patent: *Jun. 30, 2009

(54) WHEEL ASSEMBLY CAPABLE OF LATERAL MOVEMENT

(75) Inventors: Lonnie Jay Lamprich, Oklahoma City, OK (US); Bradley Keith Lamprich, Oklahoma City, OK (US)

(73) Assignee: Lamprich Medical, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/881,162

(22) Filed: Jul. 26, 2007

(65) Prior Publication Data

US 2008/0007108 A1    Jan. 10, 2008

Related U.S. Application Data

(63) Continuation of application No. 10/961,442, filed on Oct. 8, 2004, now Pat. No. 7,264,315.

(51) Int. Cl.
   *B60B 5/04*    (2006.01)
(52) U.S. Cl. .................................. 301/5.23; 280/250.1
(58) Field of Classification Search .................. 301/5.1, 301/5.23, 5.7; 16/35 R, 45, 47; 188/2 F, 188/19, 20, 68, 69; 280/250.1
   See application file for complete search history.

(56) References Cited

U.S. PATENT DOCUMENTS

| 3,789,947 | A | 2/1974 | Blumrich |
| 3,882,885 | A | 5/1975 | McCain |
| 4,039,233 | A | 8/1977 | Schmidt |
| 4,823,900 | A | 4/1989 | Farnam |
| 5,312,165 | A | 5/1994 | Spletter |
| 5,323,867 | A | 6/1994 | Griffin et al. |
| 5,445,233 | A | 8/1995 | Fernie et al. |
| 5,553,874 | A | 9/1996 | Schouten et al. |
| 5,588,663 | A | 12/1996 | Rundle et al. |
| 6,120,047 | A | 9/2000 | Axelson et al. |
| 6,431,664 | B1 | 8/2002 | Sawada |
| 6,607,250 | B2 | 8/2003 | Papac |
| 6,619,758 | B1 | 9/2003 | Ross |
| 6,655,503 | B1 | 12/2003 | Moody |
| 6,702,350 | B1 | 3/2004 | Gorniak |
| 6,722,680 | B2 | 4/2004 | DeLong et al. |
| 6,769,705 | B1 | 8/2004 | Schlangen |
| 6,796,618 | B2 | 9/2004 | Harris |
| 6,857,707 | B2 | 2/2005 | Guile |
| 7,422,079 | B2 * | 9/2008 | Hsiao ........................ 180/65.1 |
| 2005/0134106 | A1 | 6/2005 | Guile |

FOREIGN PATENT DOCUMENTS

WO    WO 2004/014667    2/2004

* cited by examiner

*Primary Examiner*—Russell D Stormer
(74) *Attorney, Agent, or Firm*—McAfee & Taft

(57) ABSTRACT

A wheel assembly having multiple small rotatable wheels mounted laterally thereon whereby lateral movement as well as forward and backward movement is provided. A pair of the wheel assemblies are utilized on a hand-propelled wheelchair that can be moved laterally as well as in the standard forward-reverse motion. The wheelchair comprises a frame, one or more axles, a pair of main wheels rotatable on the one or more axles, and a plurality of small rotatable outer wheels positioned laterally on the main wheels.

11 Claims, 5 Drawing Sheets

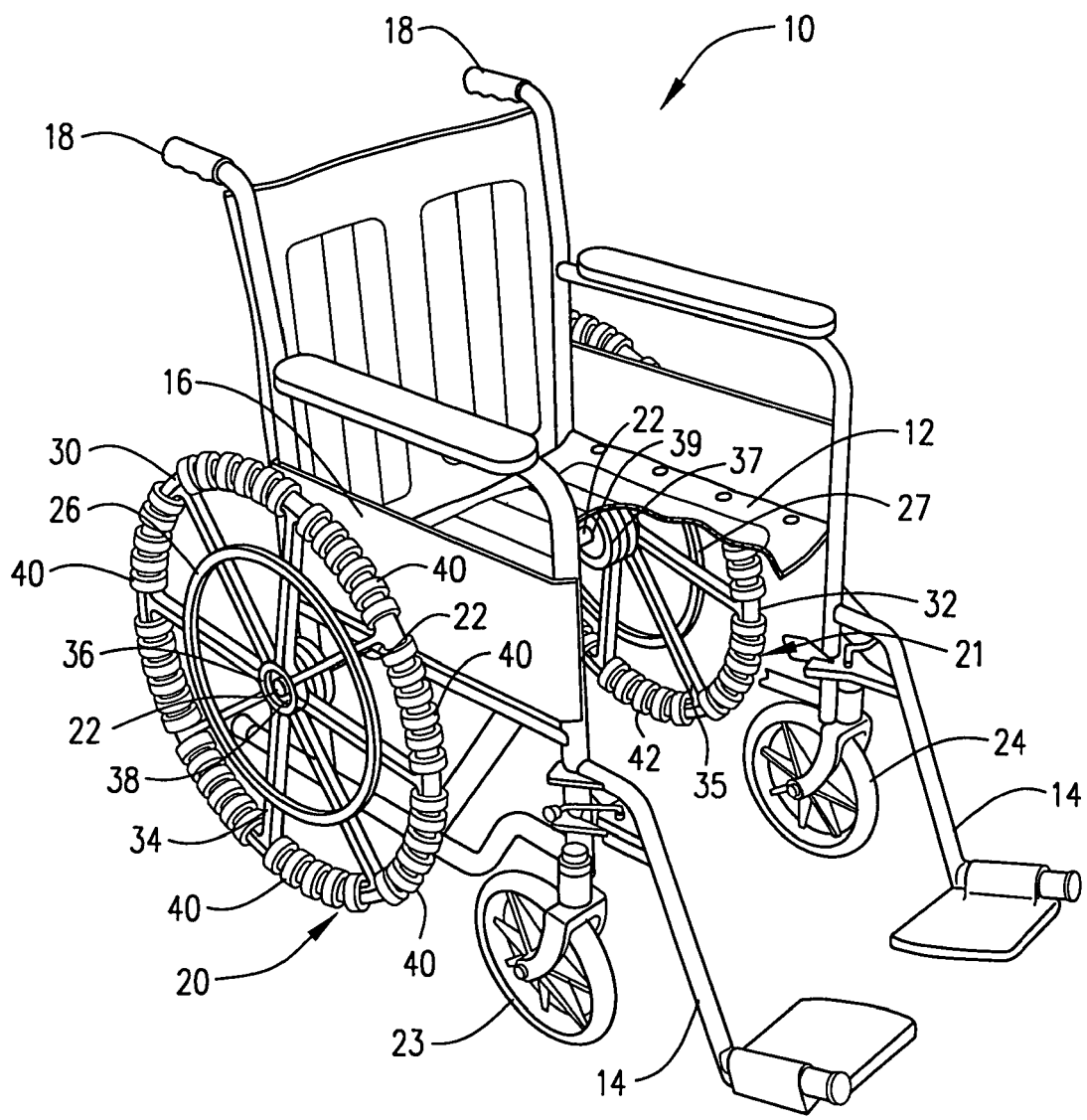

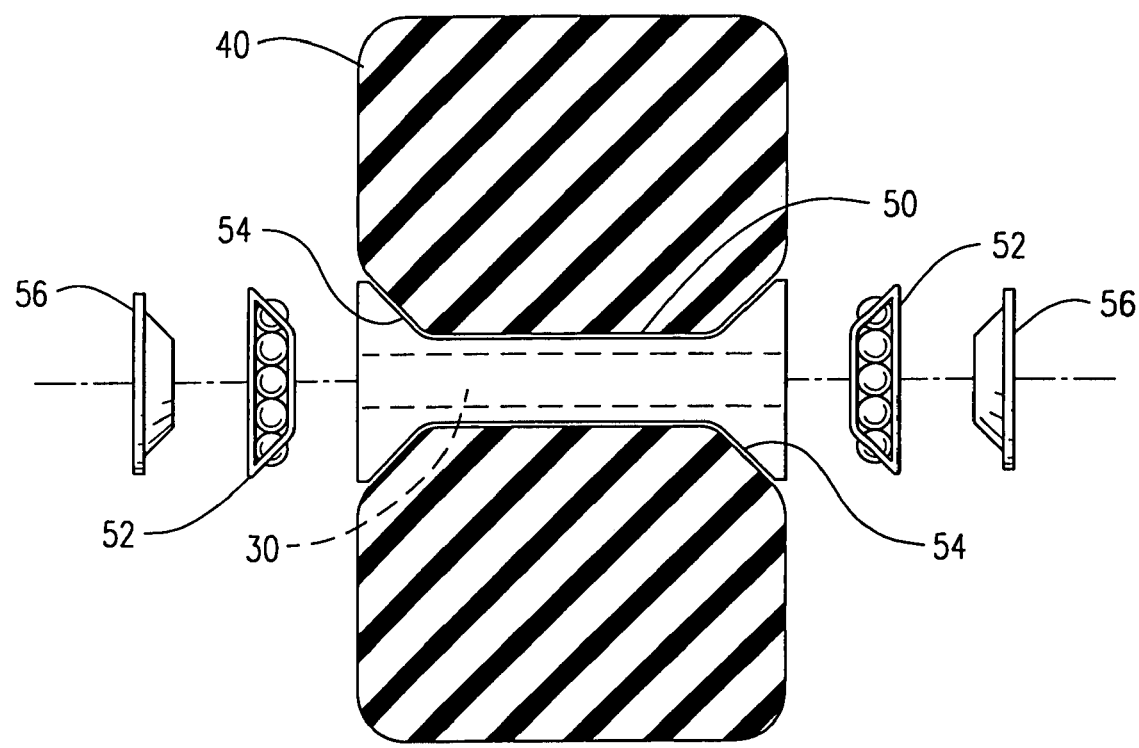
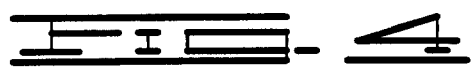

WHEEL ASSEMBLY CAPABLE OF LATERAL MOVEMENT

CROSS-REFERENCE TO RELATED APPLICATION

This application is a continuation of U.S. patent application Ser. No. 10/961,442 filed Oct. 8, 2004 now U.S. Pat. No. 7,264,315.

BACKGROUND OF THE INVENTION

1. Field of the Invention

This invention relates to an improved wheel assembly and wheelchair, and in particular to a wheel assembly having multiple small rotatable wheels mounted laterally on a main wheel whereby lateral movement as well as forward and backward movement is possible.

2. Description of the Prior Art

Wheelchairs are available in a variety of shapes and sizes. The traditional wheelchair design, whether powered, manual or pushed by another person, has two main, large diameter, side mounted wheels having fixed parallel positions and having hand rails attached thereto. Because of the fixed parallel positions of the main wheels, movement is generally restricted to pivoting, straight line or curved movement. Curved and pivoting movement is attained by rotating the main wheels at different speeds or in opposite directions. However, the wheelchair cannot achieve side-to-side lateral motion.

In order to shift position laterally, a wheelchair operator must back up, pivot, move forward, pivot, and move forward again. This may be tolerable in some situations; however, the inability to move laterally causes significant difficulty in maneuvering in tight quarters such as bathrooms and elevators. Even in a confined office or work setting, the constant backing and pivoting is time consuming and unproductive.

Transport wheelchairs utilizing four small wheels that rotate have been developed that enhance mobility in tight quarters. However, this type of chair requires the constant presence of an assistant since it cannot be hand propelled.

Thus, there is a need for hand-propelled wheelchairs that can be moved laterally as well as in the standard forward-reverse movement. There is also a need for a wheel assembly that can move laterally as well as forward and backward.

SUMMARY OF THE INVENTION

A wheel assembly, wheelchair and method are provided by the present invention.

A wheel assembly of the invention that is capable of forward-reverse movement as well as lateral movement comprises a main wheel rotatable on an axle and a plurality of small rotatable outer wheels positioned laterally on the main wheel. The main wheel is rotatable in a plane on the axle and each outer wheel is rotatable on the main wheel in a second plane perpendicular to the first plane.

In a preferred wheel assembly, a plurality of small rotatable outer wheels are attached laterally to the main wheel by ball bearings. In one embodiment, the outer wheels each comprise an inner race, a ring of ball bearings, an outer race, and a tire mounted on the outer race. In another embodiment, each outer wheel comprises a hub having fixed outer hub sides and an outer circumference on which a tire is disposed. A pair of bearing cones are positioned on the main wheel between the hub the outer hub sides.

A wheelchair of this invention comprises a pair of main wheels attached to hubs that rotate on axles by a plurality of spokes. Small outer rotatable wheels and wheel bearings are positioned on the main wheels between the spokes. The small outer rotatable wheels are positioned perpendicularly to the main wheels as close together as possible. The outer tire surfaces of the small rotatable wheels define an essentially continuous wheel assembly circumference. Preferably, the outer tire surfaces are shaped to maximize the circularity of the wheel assembly circumference. An optional brake assembly is attached to the wheelchair for preventing the outer small rotatable wheels from rotating when the wheelchair is moved forward or backward.

The wheelchair of this invention comprises a frame, one or more axles, a pair of rearward main wheel assemblies as defined above attached to the one or more axles and a pair of front castor wheels. The wheelchair is hand-propelled using hand rails mounted on the main wheels and as mentioned above, it can optionally include a brake assembly for preventing rotation of the small outer rotatable wheels.

A method of moving the hand-propelled wheelchair of this invention laterally comprises the steps of releasing the small rotatable wheel brake if included and exerting a lateral force against a proximate object. The lateral force can be exerted by a person or patient in the wheelchair or by an attendant.

The features and advantages of the present invention will become readily apparent to those skilled in the art upon a reading the following description of preferred embodiments taken in conjunction with the accompanying drawings.

BRIEF DESCRIPTION OF THE DRAWINGS

FIG. 1 is a perspective view of a wheelchair of this invention.

FIG. 4 illustrates another outer lateral wheel configuration that can be used while

FIG. 5 is a front expanded view of a main wheel including lateral rotatable outer wheels and an un-applied lateral movement brake.

FIG. 6 is an enlarged view similar to FIG. 5 showing the brake when applied.

DESCRIPTION OF THE PREFERRED EMBODIMENTS

Figure 2:
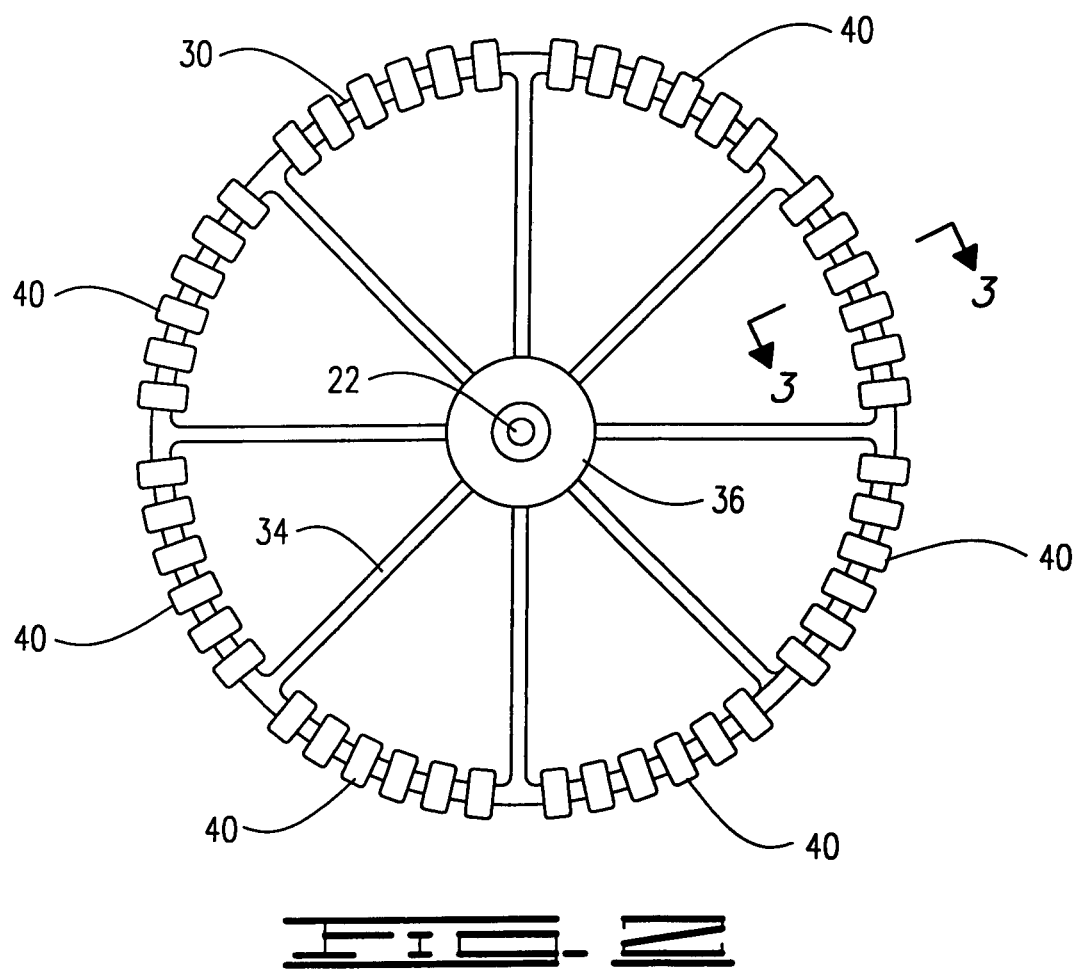
FIG. 2 is a side view of a wheel assembly of this invention.

As mentioned, a wheel assembly of this invention is capable of forward-reverse movement as well as lateral movement. Referring to FIG. 1, a main wheel assembly 20 of this invention is shown attached to a wheelchair 10. The main wheel assembly 20 includes a main wheel 30, radially extending spokes 34 and a central hub 36 that includes a bearing 38. A plurality of small rotatable outer wheels 40 are positioned laterally on the main wheel as will be described further hereinbelow.

Referring still to FIG. 1, the wheelchair 10 of this invention is illustrated comprising a frame 16 having a seat assembly 12 and a footrest assembly 14 mounted thereon, and having main wheel assemblies 20 and 21 and castor wheels 23 and 24 attached thereto. The seat, footrest and frame assemblies may be connected by welding, bolting or other means. Extended push handles 18 are attached to the frame to enable an attendant to push and direct the wheelchair.

A rolling movement is achieved by the main wheel assemblies 20 and 21 rotatably mounted on one or more axles 22 attached to the rearward portion of the frame assembly 16. The castor wheels 23 and 24 are attached to the front portion of the frame assembly 16. The wheelchair can be hand-propelled without an attendant by using the hand rails 26 and 27 connected to the main wheel assemblies 20 and 21.

The main wheel assemblies 20 and 21 of this invention comprise main wheels 30 and 32, radially extending spokes 34 and 35 and central hubs 36 and 37. Bearings 38 and 39 are mounted in the hubs 36 and 37 which facilitate rotation of the main wheel assemblies about the one or more axle or axles 22. The main wheels 30 and 32 are of a large diameter compared to the smaller castor wheels 23 and 24 to facilitate hand-propelling of the wheelchair.

While conventional hand-propelled wheelchairs generally have tires mounted on main wheel rims, the main wheels 30 and 32 of the wheelchair of this invention are formed of metal or other strong material. In order to allow the wheelchair 10 of this invention to move laterally, a plurality of small laterally positioned rotatable outer wheels 40 and 42 are attached to each of the main wheels as shown in FIGS. 1 and 2 of the drawings.

The number of laterally positioned rotatable outer wheels 40 and 42 that are mounted on the main wheels 30 and 32 can vary in wheelchairs and similar applications.

However, in wheelchairs it is best to utilize a large number of closely mounted narrow lateral wheels to thereby make the main wheels as circular and smooth riding as possible.

Figure 3:
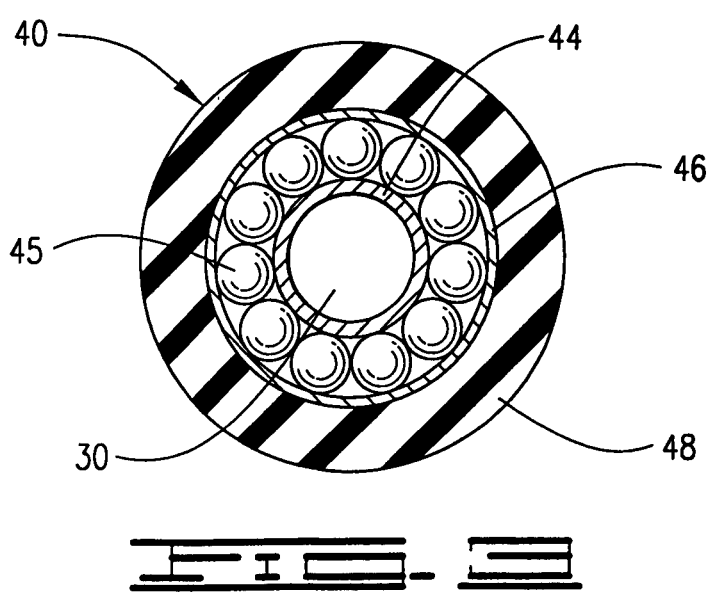
FIG. 3 is an outer lateral wheel viewed along lines 3-3.

Referring now to FIGS. 2 and 3, the laterally positioned rotatable outer wheels 40 mounted on the main wheels 30 and 32 (only the main wheel 30 is shown in FIG. 2) include ball bearings 45 held between inner and outer races 44 and 46 as shown in FIG. 3. The inner races 44 are positioned on and attached to the main wheels 30 and 32 of the wheelchair. The main wheels function as axles to the inner races 44 such that the plane of rotation of the outer races 46 is perpendicular to the plane of rotation of the main wheels 30 and 32. Tires 48 are mounted on outer races 46. In another configuration shown in FIG. 4, each outer wheel comprises a set of cone bearings 52 on opposite sides of a hub 50. The bearings 52 are held against conical outer hub sides 54 by side cones 56 which are attached to the main wheels 30 and 32 by welding or other means. Tires 49 are mounted on the hubs 50.

Figure 4A:
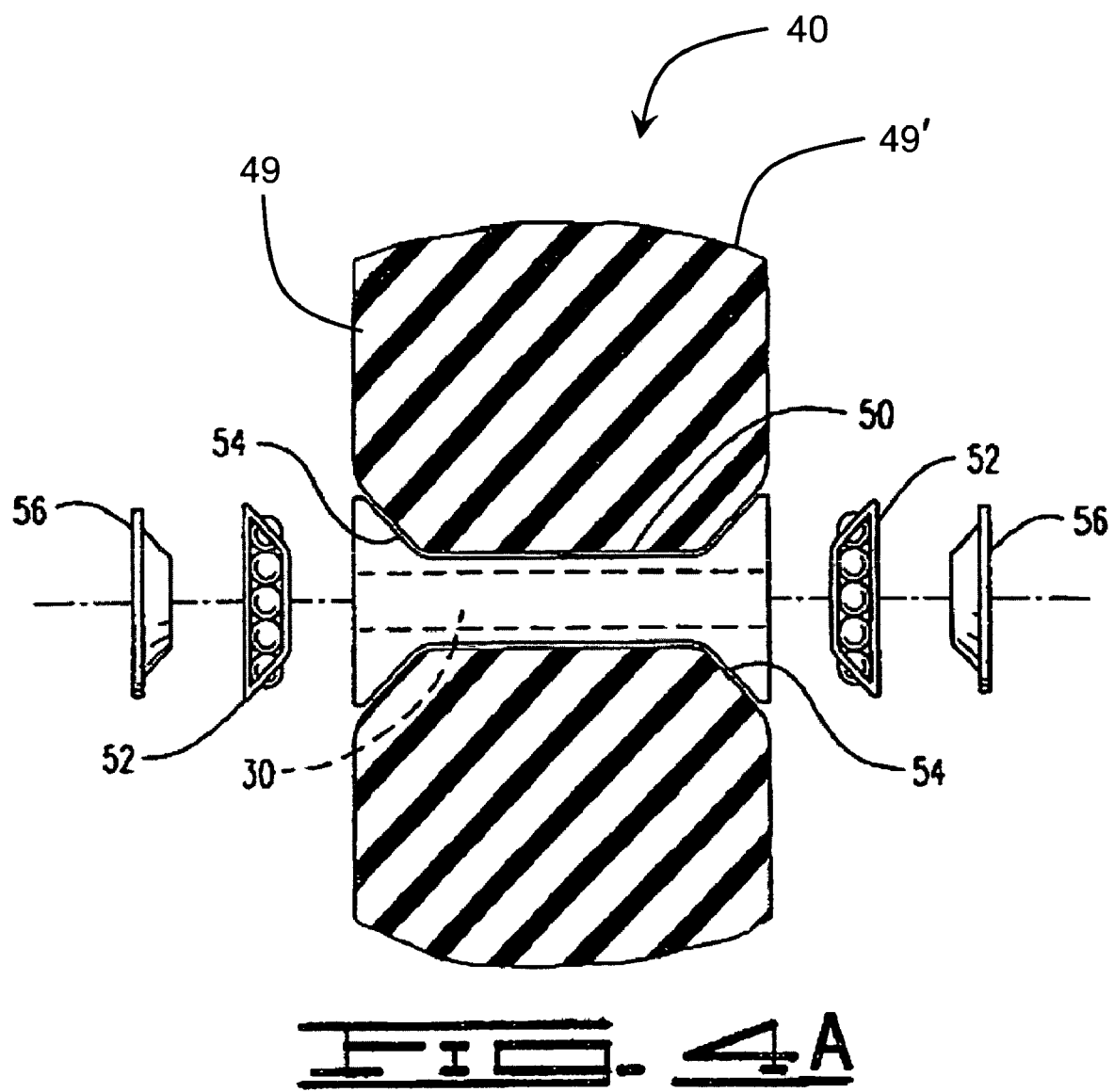
FIG. 4A depicts an alternative outer wheel having a curvature similar to the main wheel curvature.
Figure 11:
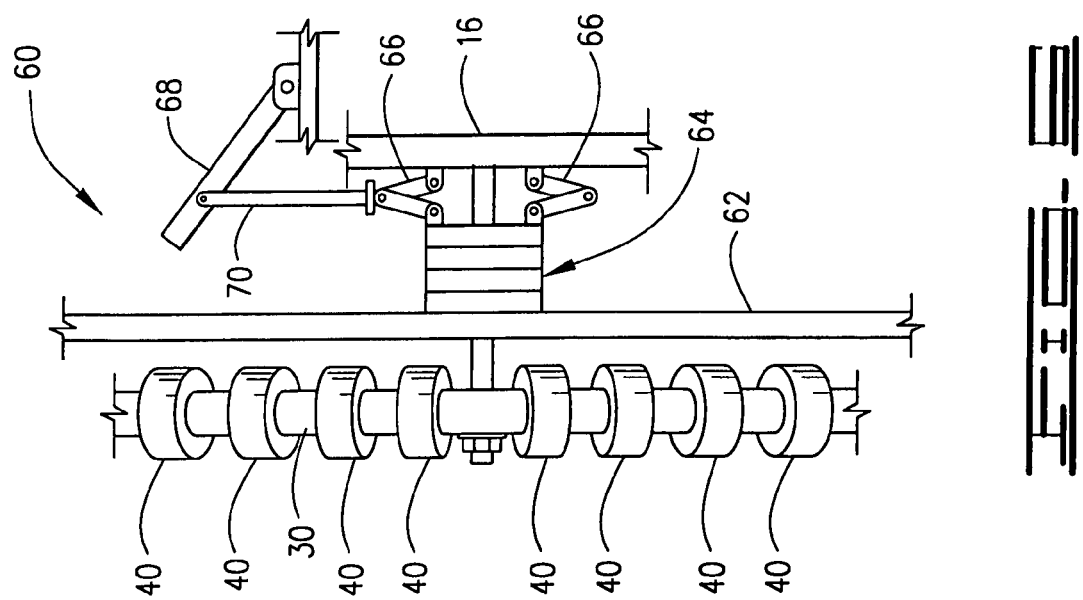
Figure 12:
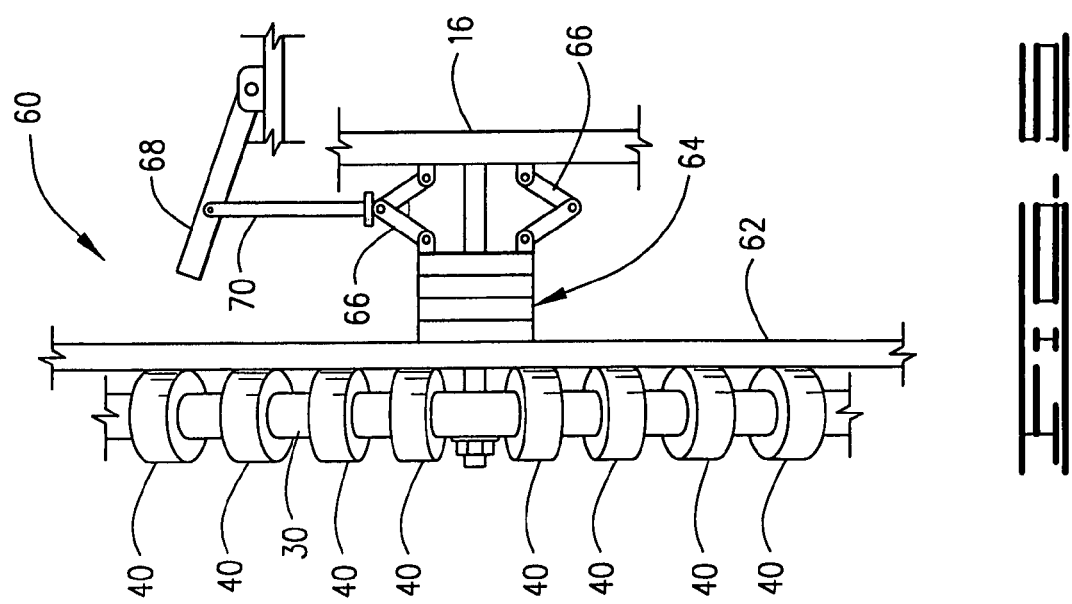

As mentioned above, the placement of the outer lateral wheels 40 and 42 on the main wheels 30 and 32 should be close together leaving only the space necessary for the spokes 34. Relatively small spaces between the outer wheels provide a smoother ride. Also, shaping the outer tires with a curvature similar to the main wheel curvature rather than flat will improve the smoothness of forward-reverse movement. As shown in FIG. 4A, the curvature of surface 49' provides wheel 49 with a curvature similar to the main wheel curvature.

A lateral braking system can be provided to prevent the outer lateral wheels 40 and 42 from rotating while the wheelchair is in normal forward-reverse operation. This may not be necessary on level floors such as in a hospital or home, but is necessitated on a slope. When a lateral movement is desired, the lateral brake is released and a stationary object, such as a wall in an elevator or a restroom door, is pushed against by a person or patient in the wheelchair or by an attendant to provide the force necessary to cause the wheelchair to move laterally.

An example of a lateral braking system 60 that can be utilized is shown in FIGS. 5 and 6 positioned between the wheelchair frame 16 and the main wheel assembly 20. A brake disk 62 is applied against the outer lateral wheels 40 as shown in FIG. 5 by moving the brake disk 62 into contact with the outer lateral wheels 40. The pressure applied by the brake disk 62 stops rotation of the outer lateral wheels 40, and thus insures against unwanted lateral motion. The brake disk 62 is rigidly attached to a set of bearings 64 that allow the brake disk 62 to rotate with the outer lateral wheels 40 while pressure is applied to the brake disk 62 and the lateral wheels 40. The pressure is applied by an extending or retracting set of arms 66 that are attached to a lever 68 by means of a connecting rod 70. By moving the lever 68 downward, the arms 66 extend and move the brake disk 62 into contact with the outer lateral wheels 40 stopping their rotation as shown in FIG. 5. When the lever 68 is moved upward, the arms 66 retract and move the brake disk 62 out of contact with the outer lateral wheels 40 whereby they are free to rotate as shown in FIG. 6.

Undesired lateral motion is prevented by applying a lateral braking system, such as the one described above, to the outer lateral wheel assemblies of a single main wheel. It is possible, but not necessary, to apply a lateral braking system to both main wheels. Also, other lateral braking systems can be used that are known and understood by those skilled in the art.

A method of this invention for laterally moving a hand-propelled wheelchair of this invention comprising wheel assemblies capable of forward-reverse motion as well as lateral motion, the wheel assemblies including main wheels mounted rotatably on one or more axles, a plurality of small rotatable outer wheels laterally positioned on the main wheels and a brake for preventing the rotation of the small rotatable outer wheels comprises the steps of: releasing the brake; and causing the wheelchair to move laterally by exerting a lateral force against a proximate object.

While certain preferred embodiments of the invention have been illustrated and described for purposes of the present disclosure, numerous changes in the design and arrangement of parts and steps may be made by those skilled in the art, which changes are encompassed within the scope and spirit of the present invention as defined by the appended claims.

What is claimed is:

1. A wheel assembly capable of forward or reverse motion as well as lateral motion comprising:
   a first wheel assembly comprising a main wheel, a hub and at least one spoke joining said hub to said main wheel, said first wheel assembly rotatable on an axle;
   a plurality of small rotatable outer wheels positioned laterally on the main wheel, wherein said main wheel functions as the axle for said small rotatable outer wheels; and,
   a lateral braking system carried by said wheel, said lateral braking system movable from a position contacting said small rotatable outer wheels thereby precluding rotation of said small rotatable outer wheels to a position permitting rotation of said small rotatable outer wheels.

2. The wheel assembly of claim 1 wherein the wheel is rotatable in a first plane on the axle and each small rotatable outer wheel is rotatable on the wheel in a second plane perpendicular to the first plane.

3. The wheel assembly of claim 1 wherein each small rotatable outer wheel comprises an inner race, ball bearings, an outer race, and a tire mounted on the outer race, wherein said inner race is positioned on said main wheel.

4. The wheel assembly of claim 1 wherein each small rotatable outer wheel comprises a hub having side cone bearings and sides and an outer circumference on which a tire is disposed, wherein said sides are secured to said main wheel.

5. The wheel assembly of claim 1 which further comprises a plurality of spokes between which the small rotatable outer wheels are positioned and wherein a majority of said small rotatable wheels are positioned adjacent to one another.

6. The wheel assembly of claim 1 wherein the small rotatable outer wheels have outer surfaces shaped to maximize the circularity of the main wheel.

7. The wheel assembly of claim 1, wherein said lateral braking assembly comprises a disk movable from a first position contacting said small rotatable wheels to a second position out of contact with said small rotatable wheels.

8. A method of laterally moving a wheel supported device across a floor, the wheel supported device comprising wheel assemblies capable of forward-reverse motion as well as lateral motion, the wheel assemblies including main wheels mounted rotatably on one or more axles and a plurality of small rotatable outer wheels positioned on the main wheels, wherein each main wheel functions as the axle for said small rotatable outer wheels and a brake carried by at least one main wheel for preventing the rotation of the small rotatable outer wheels, the method comprising the steps of:

releasing said brake, thereby permitting rotation of said small rotatable outer wheels;

exerting a lateral force against a proximate object thereby causing said small rotatable outer wheels in contact with said floor to rotate on said main wheels; and moving the wheelchair laterally.

9. The method of claim 8, wherein said step of releasing said brake further comprises moving said brake from a first position contacting said small rotatable wheels to a second position out of contact with said small rotatable wheels.

10. A method of laterally moving a hand-propelled wheelchair across a floor, the wheel chair comprising wheel assemblies capable of forward-reverse motion as well as lateral motion, the wheel assemblies including main wheels mounted rotatably on one or more axles and a plurality of small rotatable outer wheels positioned on the main wheels, wherein each main wheel functions as the axle for said small rotatable outer wheels and a brake carried by at least one main wheel for preventing the rotation of the small rotataNe outer wheels, the method comprising the steps of:

releasing said brake, thereby permitting rotation of said small rotatable outer wheels;

exerting a lateral force against a proximate object thereby causing said small rotatable outer wheels in contact with said floor to rotate on said main wheels; and moving the wheelchair laterally.

11. The method of claim 10, wherein said step of releasing said brake further comprises moving said brake from a first position contacting said small rotatable wheels to a second position out of contact with said small rotatable wheels.

\* \* \* \* \*

UNITED STATES PATENT AND TRADEMARK OFFICE
CERTIFICATE OF CORRECTION

PATENT NO. : 7,552,977 B2
APPLICATION NO. : 11/881162
DATED : June 30, 2009
INVENTOR(S) : Lonnie Jay Lamprich and Bradley Keith Lamprich It is certified that error appears in the above-identified patent and that said Letters Patent is hereby corrected as shown below:

Column 6, line 11 - delete "rotataNe" and substitute therefor --rotatable--.

Signed and Sealed this

Third Day of November, 2009

David J. Kappos
*Director of the United States Patent and Trademark Office*